United States Patent [19]

Keckler et al.

[11] Patent Number: 4,737,937

[45] Date of Patent: Apr. 12, 1988

[54] MARINE SEISMIC STREAMER EMPLOYING VARIABLE HYDROPHONE DENSITY

[75] Inventors: William G. Keckler; Robert G. Zachariadis, both of Dallas, Tex.

[73] Assignee: Mobil Oil Corporation, New York, N.Y.

[21] Appl. No.: 31,056

[22] Filed: Mar. 27, 1987

[51] Int. Cl.$^4$ .............................................. G01V 1/38
[52] U.S. Cl. ..................................... 367/20; 367/154; 174/101.5
[58] Field of Search ..................... 367/15, 20, 22, 106, 367/130, 154, 911; 181/110; 174/101.5

[56] References Cited

U.S. PATENT DOCUMENTS

| | | | |
|---|---|---|---|
| 2,825,039 | 2/1958 | Schurman et al. | 174/101.5 |
| 3,299,391 | 1/1967 | Herrmann et al. | |
| 3,319,734 | 5/1967 | Pavey, Jr. | |
| 3,371,739 | 3/1968 | Pearson | |
| 3,506,085 | 4/1970 | Loper | |
| 3,852,708 | 12/1974 | Doolittle et al. | 367/20 |
| 4,146,870 | 3/1979 | Ruehle | |
| 4,204,188 | 5/1980 | Weichart et al. | |
| 4,581,724 | 4/1986 | Zachariadis | |

Primary Examiner—Charles T. Jordan
Assistant Examiner—John W. Eldred
Attorney, Agent, or Firm—Alexander J. McKillop; Michael G. Gilman; George W. Hager, Jr.

[57] ABSTRACT

A marine seismic streamer employs a plurality of sections connected together sequentially with fluid blocking connectors. Each section contains a plurality of groupings of hydrophones with the hydrophones within each grouping connected together to provide a single seismic signal output for such groupings. The two terminal groupings of each section have variable hydrophone densities along their lengths so as to discriminate against noise generated in the streamer by the action of the fluid blocking connectors in producing pressure waves in the fluid fill within the streamer.

7 Claims, 2 Drawing Sheets

MARINE SEISMIC STREAMER EMPLOYING VARIABLE HYDROPHONE DENSITY

BACKGROUND OF THE INVENTION

This invention relates to marine seismic exploration and, more particularly, to a marine seismic streamer configured to reduce two noise on the recorded seismic data by employing variable hydrophone density along the length of the streamer.

In conducting a marine seismic survey, a seismic energy source is employed by an exploration vessel to generate a seismic signal, referred to as a seismic pressure wave, which is transmitted through the water layer into the subsurface formations. A portion of the signal is reflected from the subsurface reflecting interfaces back to the water layer where it is received by a seismic streamer being towed behind the exploration vessel. The streamer is comprised of a plurality of hydrophones which generate electrical signals in response to the received seismic signals. The hydrophones are spread along the length of the streamer and are electrically connected through the streamer to seismic recording instruments on board the exploration vessel. Such a marine seismic survey may be typically carried out with the exploration systems of the type described in U.S. Pat. No. 4,146,870 to W. H. Ruehle and U.S. Pat. No. 4,581,724 to R. G. Zachariadis wherein a seismic energy source and seismic streamer are towed through the water along a line of exploration.

In seismic marine operations numerous problems are encountered in the recording of seismic data that are not encountered during land operations. A primary one of these problems is two noise generated by both the movement of the vessel and the streamer through the water as they traverse along the line of exploration.

It is, therefore, a primary object of the present invention to provide for a seismic streamer than can discriminate against such row noise and thereby provide seismic signals with less distortion, more dynamic range, and broader frequency spectrum than provided by conventional seismic streamers. Seismic signals with lower distortion and broader dynamic range will resolve thin beds and stratigraphic traps more readily. Reducing noise will permit detection of deeper events and better resolution of events at all levels.

SUMMARY OF THE INVENTION

The present invention is directed to a marine seismic streamer comprising a plurality of sections connected together by fluid blocking members, each section being divided into a plurality of hydrophone containing modules. The hydrophone spacings in the two terminal modules that are next to the fluid blocking members are of non-uniform and non-symmetrical densities as opposed to the uniform or symmetrical densities used in the intermediate modules.

In one aspect of the invention, a first portion along the end of each terminal module that is adjacent a fluid blocking connector contains no hydrophones and a second portion along the opposite end of such terminal module contains equally spaced hydrophones.

In still further aspect, a third portion of each terminal module is located between the first and second portions and contains equally spaced hydrophones with a density greater than that of such second portion. The number of hydrophones in the second and third portions may be selected to provide effective center-to-center spacings for the terminal modules with respect to the intermediate modules that is about the same as the center-to-center spacing between each of the intermediate modules.

In an even more specific aspect, such first and third portions are of equal length and such second portion is twice such length. In addition the second and third portions contain an equal number of hydrophones, whereby the density of hydrophones in such third portions is twice that of the second portion.

DESCRIPTION OF THE PREFERRED EMBODIMENT

Figure 1:
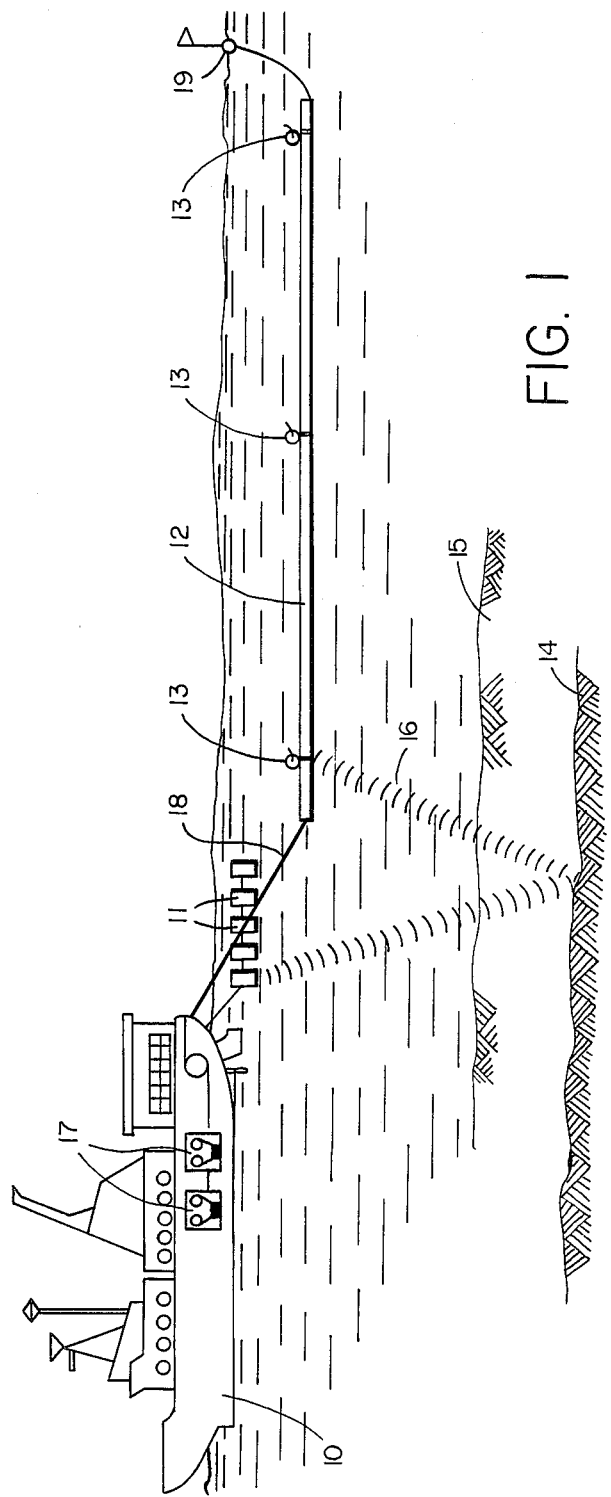
FIG. 1 illustrates a marine seismic exploration system with which the marine seismic streamer of the present invention may be utilized.

Referring to FIG. 1, there will be described a marine seismic exploration system with which the marine seismic streamer of the present invention may be employed. The seismic marine exploration vessel 10 traverses a line of exploration. The vessel 10 tows one or more seismic energy sources 11 and a seismic streamer 12 employing a plurality of hydrophones spaced along the length of the streamer. Seismic energy is generated in the water by the source 11 and reflections 16 of such energy from subsurface formations, such as illustrated at 14 below the water bottom 15, are detected by the plurality of hydrophones along the streamer 12 as seismic reflection signals. These seismic signals are transferred to data recording and processing equipment 17 on the vessel 10 by way of electrical wiring through streamer 12 and up streamer tow cable 18. FIG. 1 does not show conventional or start-of-the-art mechanical features of a streamer such as strain member, electrical cables, spacers, or even the hydrophones themselves. These features are clearly disclosed in numerous U.S. patents, for example, U.S. Pat. Nos. 3,299,397 and 3,319,734 to G. M. Pavey, Jr. et al.; U.S. Pat. No. 3,371,739 to R. H. Pearson; and U.S. Pat. No. 4,204,188 to H. Weichart et al. The streamer 12 may additionally be provided with one or more depth control devices 13 and a tail bouy 19. A typical seismic energy source 11 used in marine seismic exploration may comprise one or more air guns of the type described in U.S. Pat. No. 3,506,085 to G. B. Loper. A typical data recording and processing system 17 is the Texas Instruments Model DFS-V Ditigal Field Recorder.

Having described a typical marine seismic exploration system, there will now be described in more detail a typical marine seismic streamer.

Figure 2:
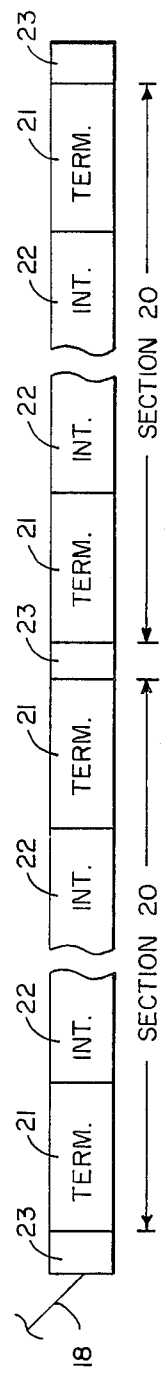
FIG. 2 illustrates the module configuration of the marine seismic streamer of the present invention.

FIG. 2 shows such a streamer 12 divided into a plurality of streamer sections 20 coupled together by the bulkhead connectors 23. Each streamer section 20 is divided into a plurality of modules of convenient units of length, such as terminal modules 21 and intermediate modules 22. Each section is identical so that they can be interchanged as necessary for repair or replacement. In a preferred embodiment, these sections would be about 100 meters long and a typical streamer might comprise 35 such sections for a total length of approximately 3500 meters. Each module in a section comprises a plurality of hydrophones spaced along the length of the module. Those hydrophones in each module are connected together to provide a single seismic signal output so as to increase signal strength and discriminate against directional noise.

The hydrophones along streamer 12 are particularly sensitive to tow noise. One such tow noise is in the form of a longitudinal vibration which travels along the length of the streamer. The vibration reaches the hydrophones as pressure waves induced by the vibration or motion of components which either fully or partially block the flow of fill fluid within the streamer.

One such blockage is that provided by conventional bulkhead connectors between the seismic streamer sections. Such connectors are in effect noise sources that convert longitudinal vibrations in the strain members in the streamer to hydrokinetic energy in the fill fluid in the terminal modules. Thus, the connectors act like pistons in generating short duration pressure pulses in the fill fluid in the near vicinity of the terminal modules. It is a specific feature of the present invention to provide a marine seismic streamer that is designated to reduce the effect of such pressure pulses in the fill fluid particularly in the near vicinity of a bulkhead connector. This is accomplished by altering the conventional streamer design of spacing hydrophones uniformly from one end of each streamer section to the other end and moving the hydrophones that would otherwise by in the near vicinity of the bulkhead connectors.

Figure 3:
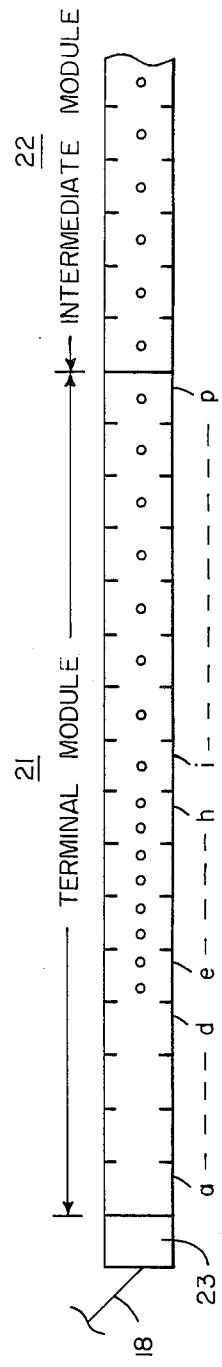
FIG. 3 is a graphical illustration of the hydrophone spacings within each of the modules of the marine seismic streamer of FIG. 2.

Referring to FIG. 3 there is shown a diagrammatic representation of a plurality of streamer modules employing variable hydrophone spacing in accordance with the present invention. The diagram is not intended to show conventional or state-of-the-art mechanical features of a streamer such as strain members, electrical conductors, spacers, or even the hydrophones themselves. These features are clearly disclosed in numerous U.S. Patents, for example, U.S. Pat. Nos. 3,299,397 and 3,319,734 to G. M. Pavey, Jr. et al.; U.S. Pat. No. 3,371,739 to R. H. Pearson; and U.S. Pat. No. 4,204,188 to H. Weichart et al.

FIG. 3 shows one end of the streamer section 20 of FIG. 2 comprising bulkhead connector 23, which is typically an electro-mechanical connector with hose-blocking bulkhead, and terminal and intermediate modules 21 and 22 respectively. Each module 21 and 22 in streamer section 20 shows a 16-hydrophone grouping. Intermediate module 22 shows a typical hydrophone grouping with equal hydrophone spacings. Terminal module 21 show a 16-hydrophone group adjacent the connector 23 modified in density through variable hydrophone spacings in accordance with the present invention. Hydrophones which would have occupied the four spaces a–d nearest the connector 23 have been moved so as to double the number of hydrophones in the next adjacent four spaces e–h thereby increasing hydrophone density in spaces e–h. The remaining hydrophones spaces i–p of module 21 are equally positioned to the end of such module, but with less density than in spaces e–h. The other end of streamer section 20 (not shown) adjacent the next succeeding bulkhead connector 23 is similarly configured. With such variable hydrophone placement there are no hydrophones in the immediate vicinity of a bulkhead connector 23 to detect the tow noise generated by such connector. Consequently, the overall group output from the terminal modules 21 of the streamer are significantly improved in signal-to-noise ratio. Further, by moving hydrophones in the terminal modules 21 from the near vicinity of the bulkhead connectors 23 and positioning them between existing hydrophone locations farther from the bulkhead rather then merely eliminating them entirely, a constant number of hydrophones is maintained in each module 21. In this way the electrical characteristics of each terminal module 21 is maintained equal and the effective center-to-center spacing between each of the modules in the streamer section is maintained about the same. It can therefore be seen that the hydrophone density can be varied along the streamer section in accordance with the present invention to reduce two noise caused by the bulkhead connectors without significantly changing the electrical or center-to-center spacing characteristics of the streamer.

Even though one embodiment of the present invention has been described herein, it will be apparent to those skilled in the art that various changes and modifications may be made in the marine seismic streamer hydrophone configuration of the present invention without departing from the spirit and scope of the invention as set forth in the appended claims. Any such changes and modifications coming within the scope of such appended claims are intended to be included herein.

We claim:

1. A marine seismic streamer for being towed behind a marine vessel along a line of exploration, comprising:
   (a) a plurality of sections connected together sequentially by fluid blocking connectors, each section having a plurality of groupings of hydrophones with the hydrophones positioned within each of said groupings connected together to provide a single seismic signal output for said grouping,
   (b) the two terminal groupings of each of said sections having variable hydrophone density along their lengths so as to discriminate against noise generated in said terminal groupings by the action of said fluid blocking connectors in producing pressure waves in the fill fluid within said terminal groupings, and
   (c) the remaining intermediate groupings of each of said sections having uniform hydrophone density along their lengths.

2. The marine seismic streamer of claim 1 wherein each of said terminal groupings comprises:
   (a) a first portion located along the end of said terminal groupings adjacent said fluid blocking connector and having no hydrophones, and
   (b) a second portion located along the opposite end of said terminal groupings wherein hydrophones are equally spaced to provide a uniform hydrophone density.

3. The marine seismic streamer of claim 2 further including a third portion located between said first and second portions wherein hydrophones are equally spaced to provide a uniform hydrophone density greater than that of said second portion.

4. The seismic streamer of claim 1 wherein each of said terminal groupings comprises:
   (a) a first portion located along the end of said terminal groupings adjacent said fluid blocking connector and comprised of void hydrophone spaces,
   (b) a second portion located along the opposite end of said terminal groupings wherein hydrophones are equally spaced to provide a uniform hydrophone density equal to that in each of said intermediate modules, and (c) a third portion between said first and second portions wherein hydrophones are spaced to provide a hydrophone density that is increased by a number of hydrophones equal to the number of void hydrophone spaces in said first portion.

5. The seismic streamer of claim 4 wherein the hydrophone density of said third portion is twice that of said second portion.

6. The seismic streamer of claim 4 wherein the number of hydrophones in said second and third portions are selected to provide effective center-to-center spacings for said terminal groupings with respect to said adjacent intermediate groupings that is about the same as the center-to-center spacings between each of said intermediate modules.

7. A marine seismic streamer, comprising:

(a) a plurality of sections connected together by fluid blocking connectors, each section being divided into a plurality of hydrophone groupings with n hydrophones connected together in each grouping to provide a single seismic signal output for said grouping, (b) the two terminal groupings of each section comprising
  (i) a first portion adjacent a fluid blocking connector and having no hydrophones;
  (ii) a second portion on the opposite end of said terminal grouping from said fluid blocking connector and having ½ n hydrophones spaced along a length twice that of said first portion, and
  (iii) a third portion located between said first and second portions and having ½ n hydrophones spaced along a length equal to that of said first portion.

* * * * *